United States Patent [19]
Wegdam et al.

[11] Patent Number: 5,647,457
[45] Date of Patent: Jul. 15, 1997

[54] FORK-LIFT TRUCK WITH HYDRAULIC DRIVE

[75] Inventors: Hendricus Johannes Wegdam, Boekelo, Netherlands; Klaus Werner Krollmann, Ahaus, Germany

[73] Assignee: B.V. Machinefabriek B.O.A., Netherlands

[21] Appl. No.: 524,550

[22] Filed: Sep. 7, 1995

[51] Int. Cl.$^6$ ............................................. B66B 9/02
[52] U.S. Cl. ............................................. 187/250; 60/464
[58] Field of Search .......................... 187/250, 275, 187/300, 281; 60/447, 464

[56] References Cited

U.S. PATENT DOCUMENTS

| | | | |
|---|---|---|---|
| 3,964,262 | 6/1976 | Patton | 60/447 |
| 4,087,969 | 5/1978 | Takahashi et al. | 60/464 |

FOREIGN PATENT DOCUMENTS

| | | |
|---|---|---|
| 0041273 | 12/1981 | European Pat. Off. . |
| 0059406 | 9/1982 | European Pat. Off. . |
| 0313415 | 4/1989 | European Pat. Off. . |
| 2613435 | 10/1988 | France . |
| 2205632 | 12/1988 | United Kingdom . |
| 2240836 | 8/1991 | United Kingdom . |

*Primary Examiner*—Kenneth Noland
*Attorney, Agent, or Firm*—Webb Ziesenheim Bruening Logsdon Orkin & Hanson, P.C.

[57] ABSTRACT

The invention relates to a fork-lift truck with a hydraulic drive comprising a hydraulic motor, a power source driving the hydraulic motor and a hydraulic control system driving the power source, characterized in that, the coupling of the hydraulic motor to the power source has arranged a sensor for measuring the pressure difference over the hydraulic motor, where the sensor is connected to a valve short-circuiting the hydraulic control system.

20 Claims, 1 Drawing Sheet

5,647,457

FORK-LIFT TRUCK WITH HYDRAULIC DRIVE

BACKGROUND OF THE INVENTION

1. Field of the Invention

The invention relates to a fork-lift truck with a hydraulic drive having a hydraulic motor, a power source driving the hydraulic motor and a hydraulic control system driving the power source.

2. Background Art

Such fork-lift trucks for displacing goods are known in many variants. "Transportable" fork-lifts are for instance known which can be fixed to the rear of a goods vehicle. These fork-lift trucks have the drawback that, when the fork-lift truck runs up against an obstacle or when a relatively steep slope is negotiated, the power source is not sufficiently great to provide the required power, i.e. the fork-lift truck is no longer moved forward at the desired speed. The power source, usually a combustion engine or electric motor connected to a pump, is herein overloaded whereby the performance capacity is reduced. In the case of a combustion engine the power source will then finally cut out if the overloading continues. This overload of the power source can only be prevented by reducing the required power. This generally means in practice that a pedal controlling the travel speed must be pressed down less deeply in the case of obstacles as described above.

The invention has for its object to provide a fork-lift truck with a hydraulic drive with which the required power is automatically adjusted downward when the power source is overloaded.

SUMMARY OF THE INVENTION

The invention provides for this purpose a fork-lift truck with hydraulic drive of the type referred to in the preamble, characterized in that, the coupling of the hydraulic motor to the power source has arranged a sensor for measuring the pressure difference over the hydraulic motor, where the sensor is connected to a valve short-circuiting the hydraulic control system. In a preferred embodiment the connection between the sensor and the valve short-circuiting the control system is formed by a hydraulic conduit. As soon as the power demanded of the hydraulic motor comes in the vicinity of the maximum power which can be provided by the power source, the pressure difference over the hydraulic motor will increase. The pressure difference does not depend on the direction of travel. The sensor, for instance a valve with a threshold value, will generate a signal when a determined pressure is exceeded. Using this signal the operation of the power source can then be adjusted by reducing the pressure in the control system. This pressure reduction is brought about in that a valve short-circuiting the system is opened. This opening of the valve can be effected in very simple manner by a hydraulic conduit connected to the sensor which consists of a sensor valve with threshold value; already present liquid pressure is utilized for the signal transfer.

This may mean in practice that when it approaches a steep incline at a determined speed the fork-lift truck will automatically begin to travel more slowly. The sensor in any case signals that the pressure over the hydraulic motor is increasing and at a determined value will transmit a signal, for instance via a hydraulic conduit, to the valve short-circuiting the control system. Through the opening of this valve the liquid pressure in the control system will fall whereby the operation of the power source is also changed. The pump of the power source will now be actuated such tat it must displace a smaller volume of liquid per unit of time at a constant rotation speed of the output shaft of the motor which drives the pump, whereby the speed of the fork-lift truck is reduced. An important advantage of this construction is that the motor will not cut out but that the pump will only pump a smaller volume of liquid. The fork-lift truck will therefore not stop but only begin to travel more slowly.

In this manner the fork-lift truck is very simple to operate; no "feel" is necessary for operation of the speed-determining pedal. The thus created power limiter also reduces wear of the motor forming part of the power source. An existing fork-lift truck of the type stated in the preamble can be equipped in very simple manner with the elements required to achieve the above stated advantages. This can also be effected very inexpensively. Particularly in locations where steep slopes are present, for example mountainous regions but also close to dike bodies, the fork-lift truck according to the invention offers great advantages. In addition it is possible to negotiate obstacles such as curbs in simple manner with the improved fork-lift truck.

A preferred embodiment of the fork-lift truck is characterized in that a valve which opens when a determined threshold value is exceeded is arranged serially with the valve short-circuiting the control system. A minimum pressure in the control system is guaranteed by means of this valve. A minimum speed of the fork-lift truck is thus fixed.

In preference the control system actuates a valve which is received in a conduit connecting the power source to the hydraulic motor. This construction enables continuously variable adjustment of the volume for delivery by the power source.

The sensor and the valve short-circuiting the control system are preferably integrated in a sensor valve. This construction makes unnecessary a signal line from the sensor to the short-circuiting valve. The construction is therefore comparatively simple.

Yet another preferred embodiment of the fork-lift truck is characterized in that the pressure difference over the hydraulic motor, wherein the valve short-circuiting the control system opens, is adjustable. In this manner the switching point can be adjusted subject to the power source, or the condition of the power source.

In yet another preferred embodiment of the fork-lift truck, the valve placed serially with the valve short-circuiting the control system has an adjustable threshold value. By means of this adjustable valve the minimum pressure in the control system can be adjusted, i.e. the minimum speed of the fork-lift truck can thereby also be adjusted.

BRIEF DESCRIPTION OF THE DRAWINGS

The present invention will be further elucidated with reference to the non-limitative embodiment shown in the following figures. Herein.

DESCRIPTION OF THE PREFERRED EMBODIMENTS

Figure 1:
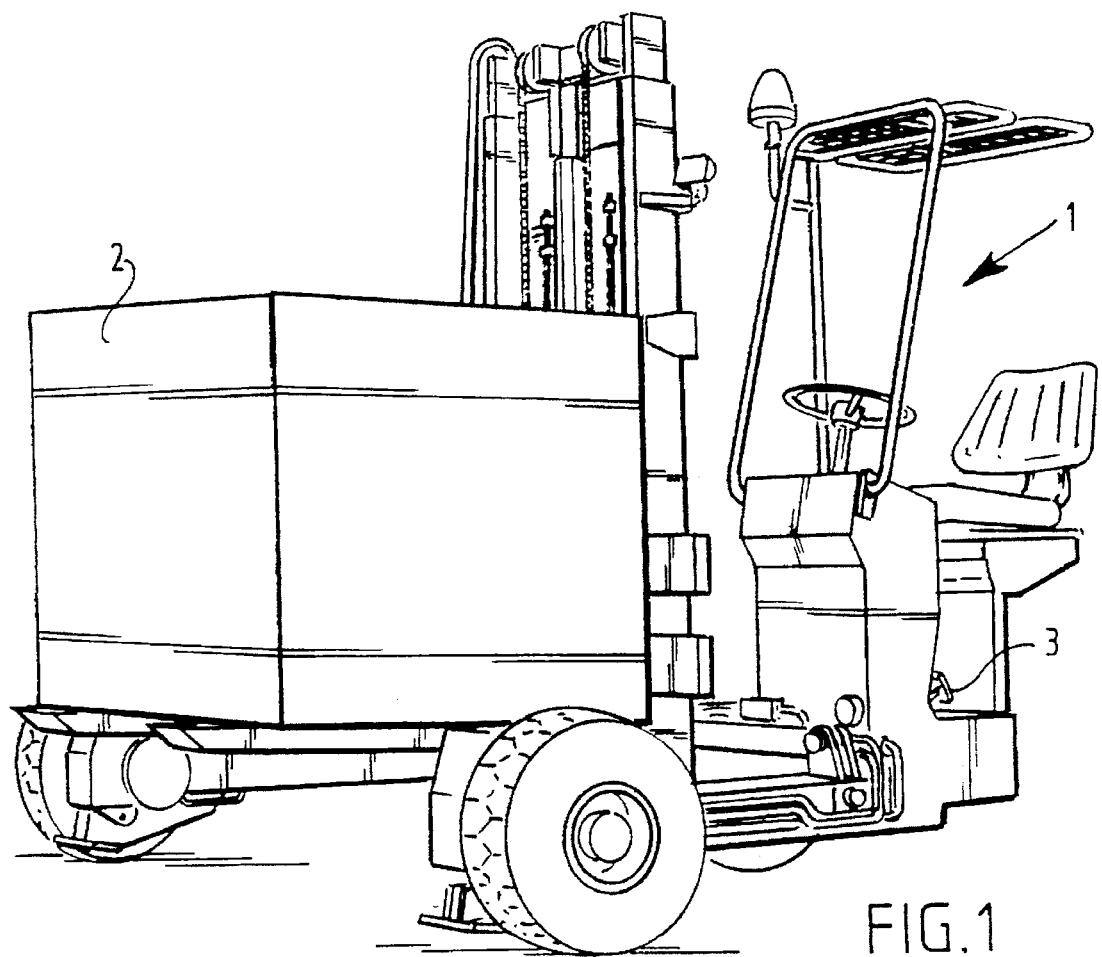
FIG. 1 shows a perspective view of a fork-lift truck.

FIG. 1 shows a fork-lift truck 1 with which a load 2 can be moved. The driving speed of fork-lift truck 1 can be regulated using a pedal 3. The travel direction of fork-lift truck 1 (forward or backwards) is not important for the present invention; the control means for determining the travel direction are therefore not shown. Fork-lift truck 1 as shown in FIG. 1 is particularly suitable for fixing to the rear of a goods vehicle.

Figure 2:
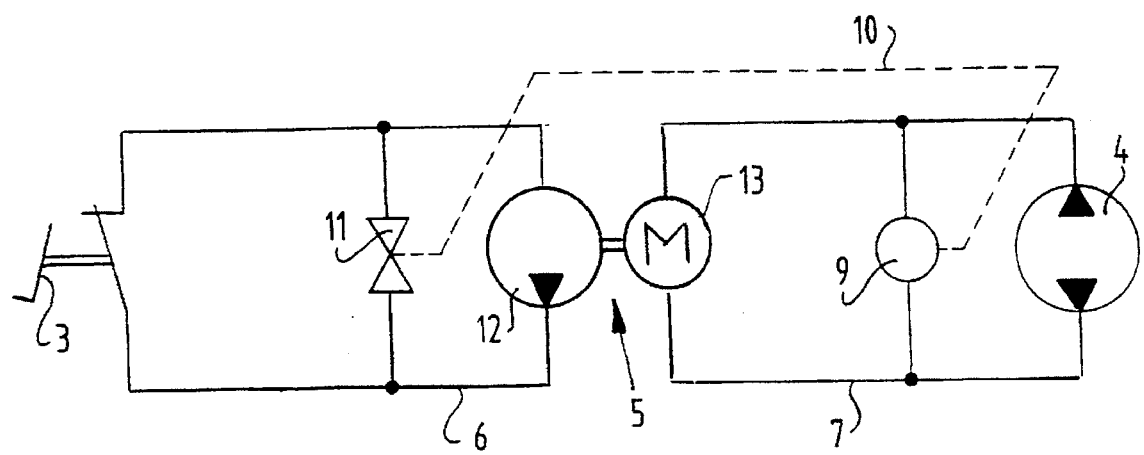
FIG. 2 is a schematic view of a circuit as described in the present invention which is incorporated in the hydraulic drive of the fork-lift truck.

FIG. 2 shows a diagram of a hydraulic coupling between a speed-regulating pedal 3 and a hydraulic motor 4 with interposing of a power source 5 formed by a pump 12 and a motor 13. A hydraulic control system 6 connects pedal 3 to power source 5 and a power-transmitting system 7 connects power source 5 to hydraulic motor 4. The motor 13 can consist for instance of a combustion engine or an electric motor. The liquid pressure in control system 6 can be controlled by displacing the pedal 3. Increasing the pressure in control system 6 results in the pump 12 being actuated to circulate a larger volume of liquid per unit of time in the power-transmitting system 7, i.e. the hydraulic motor 4 will begin to rotate more rapidly. The motor 13 is herein required to generate greater power.

When the rotation speed of the hydraulic motor 4 is greatly increased or when hydraulic motor 4 encounters extra resistance, there is the possibility that the power required from the motor 13 of power source 5 will approach maximum power. The pressure over the hydraulic motor 4 will herein increase. When the critical pressure is reached a sensor 9, for instance a sensor valve with threshold value, will transmit a signal via a signal line 10 to a valve 11 short-circuiting the control system 6. Valve 11 will be opened by the signal whereby the pressure in control system 6 decreases. The operation of the pump 12 of power source 5 is hereby changed; the required volume of liquid for displacement by the pump 12 is adjusted downward. Since the power to be provided by the motor 13 of power source 5 thereby also falls (at a constant rotation speed), the pressure difference over the hydraulic motor 4 will also decrease. In practice this means that when the fork-lift truck 1 drives against an obstacle or up a steep slope the speed of fork-lift truck 1 is adjusted downward if necessary such that the maximum power required from the motor 13 of power source 5 does not exceed a determined maximum value.

We claim:

1. A fork-lift truck with a hydraulic drive comprising a hydraulic motor, a power source driving the hydraulic motor, a hydraulic control system driving the power source, a sensor for measuring pressure difference over the hydraulic motor arranged in a coupling of the hydraulic motor to the power source, and a valve for short-circuiting the hydraulic control system that is connected to said sensor.

2. The fork-lift truck as claimed in claim 1, wherein a hydraulic conduit forms a connection between the sensor and the valve short-circuiting the hydraulic control system.

3. A fork-lift truck with a hydraulic drive comprising a hydraulic motor, a power source driving the hydraulic motor, a hydraulic control system driving the power source, a sensor for measuring pressure difference over the hydraulic motor arranged in a coupling of the hydraulic motor to the power source, a valve for short-circuiting the hydraulic control system that is connected to said sensor, and a second valve arranged serially with the valve short-circuiting the hydraulic control system, wherein said second valve opens when a determined threshold value is exceeded.

4. The fork-lift truck as claimed in claim 3, wherein the hydraulic control system actuates a valve which is received in a conduit connecting the power source to the hydraulic motor.

5. The fork-lift truck as claimed in claim 4, wherein the sensor and the valve short-circuiting the hydraulic control system are integrated in a sensor valve.

6. The fork-lift truck as claimed in claim 5, wherein the pressure difference over the hydraulic motor, when the valve short-circuiting the hydraulic control system opens, is adjustable.

7. The fork-lift truck as claimed in claim 6, wherein the second valve placed serially with the valve short-circuiting the hydraulic control system has an adjustable threshold value.

8. The fork-lift truck as claimed in claim 4, wherein the second valve placed serially with the valve short-circuiting the hydraulic control system has an adjustable threshold value.

9. The fork-lift truck as claimed in claim 3, wherein the second valve placed serially with the valve short-circuiting the hydraulic control system has an adjustable threshold value.

10. The fork-lift truck as claimed in claim 4, wherein the pressure difference over the hydraulic motor, when the valve short-circuiting the hydraulic control system opens, is adjustable.

11. The fork-lift truck as claimed in claim 3, wherein the pressure difference over the hydraulic motor, when the valve short-circuiting the hydraulic control system opens, is adjustable.

12. A fork-lift truck with a hydraulic drive comprising a hydraulic motor, a power source driving the hydraulic motor, a hydraulic control system driving the power source, a sensor for measuring pressure difference over the hydraulic motor arranged in a coupling of the hydraulic motor to the power source, a valve for short-circuiting the hydraulic control system that is connected to said sensor, a hydraulic conduit which forms a connection between the sensor and the valve short-circuiting the hydraulic control system and a second valve arranged serially with the valve short-circuiting the hydraulic control system, wherein said second valve opens when a determined threshold value is exceeded.

13. The fork-lift truck as claimed in claim 12, wherein the hydraulic control system actuates a valve which is received in a conduit connecting the power source to the hydraulic motor.

14. The fork-lift truck as claimed in claim 13, wherein the sensor and the valve short-circuiting the hydraulic control system are integrated in a sensor valve.

15. The fork-lift truck as claimed in claim 14, wherein the pressure difference over the hydraulic motor, when the valve short-circuiting the control system opens, is adjustable.

16. The fork-lift truck as claimed in claim 15, wherein the second valve placed serially with the valve short-circuiting the hydraulic control system has an adjustable threshold value.

17. The fork-lift truck as claimed in claim 13, wherein the second valve placed serially with the valve short-circuiting the hydraulic control system has an adjustable threshold value.

18. The fork-lift truck as claimed in claim 12, wherein the second valve placed serially with the valve short-circuiting the hydraulic control system has an adjustable threshold value.

19. The fork-lift truck as claimed in claim 13, wherein the pressure difference over the hydraulic motor, when the valve short-circuiting the control system opens, is adjustable.

20. The fork-lift truck as claimed in claim 12, wherein the pressure difference over the hydraulic motor, when the valve short-circuiting the control system opens, is adjustable.

* * * * *

UNITED STATES PATENT AND TRADEMARK OFFICE
CERTIFICATE OF CORRECTION

PATENT NO. : 5,647,457
DATED : July 15, 1997
INVENTOR(S) : Hendricus Johannes Wegdam et al.

It is certified that error appears in the above-indentified patent and that said Letters Patent is hereby corrected as shown below:

Column 2 Line 2 "such tat" should read --such that--.

Signed and Sealed this

Twenty-third Day of December, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,647,457
DATED      : July 15, 1997
INVENTOR(S): Hendricus Johannes Wegdam et al.

It is certified that error appears in the above-indentified patent and that said Letters Patent is hereby corrected as shown below:

Title page, insert: [30] Foreign Application Priority Data,
    Sep. 8, 1994    Netherlands......94.01465.

Signed and Sealed this

Twenty-fourth Day of February, 1998

*Attest:*

BRUCE LEHMAN

*Attesting Officer*    *Commissioner of Patents and Trademarks*